Patented Dec. 2, 1952

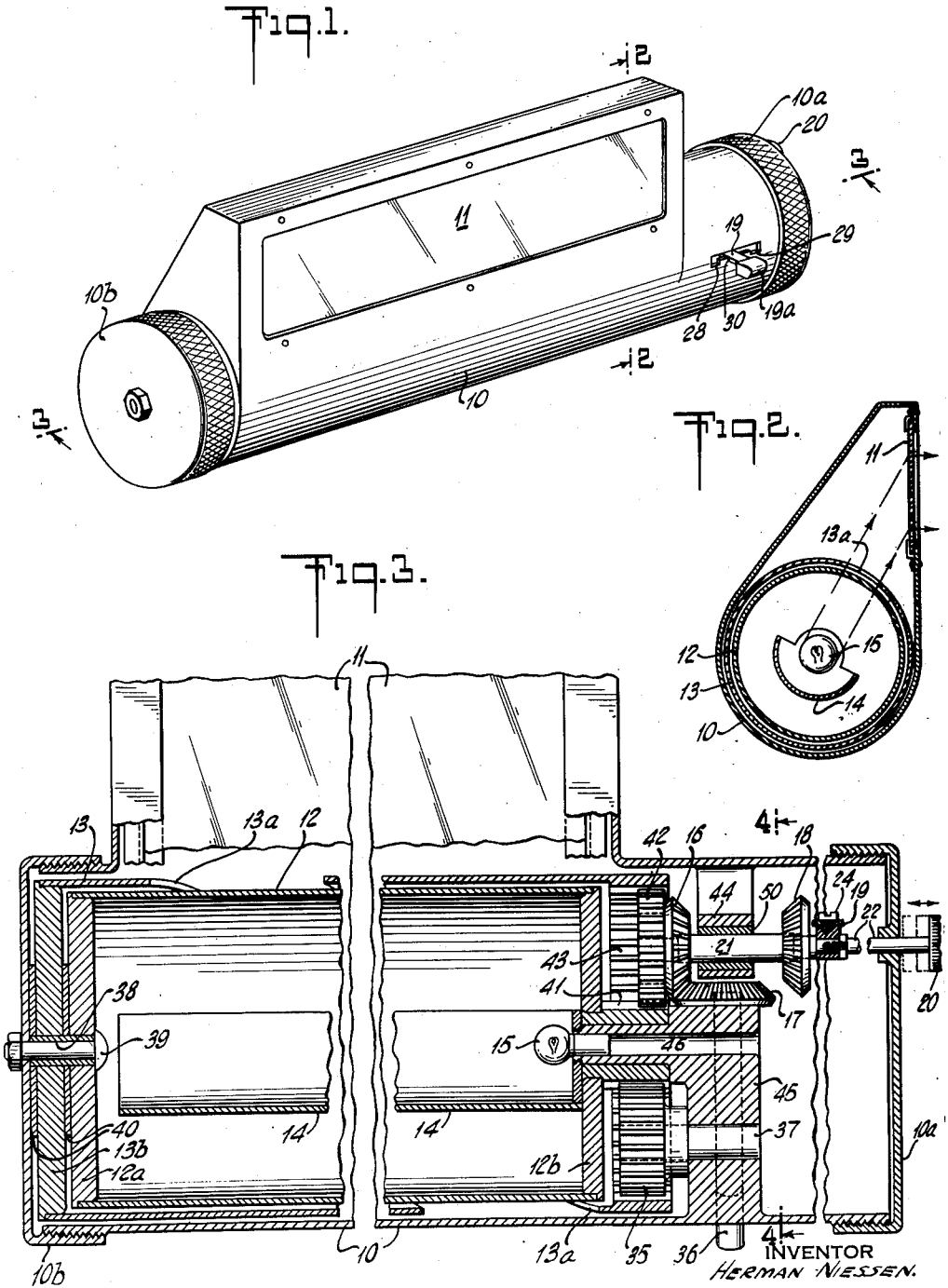

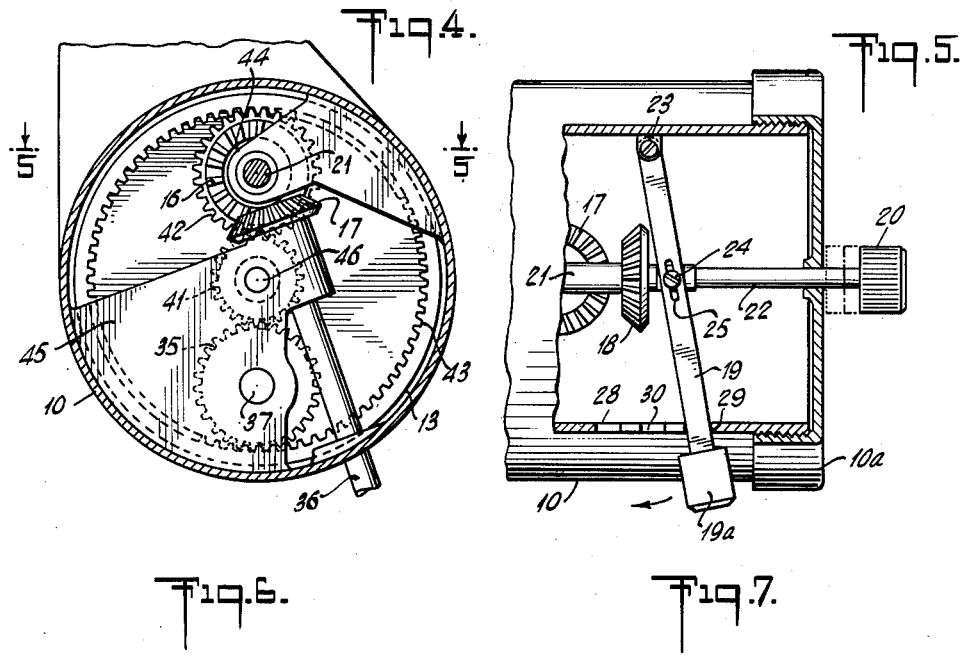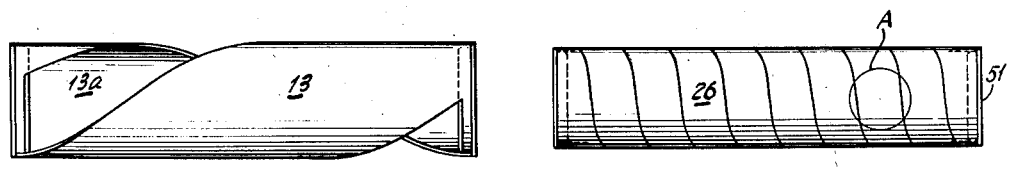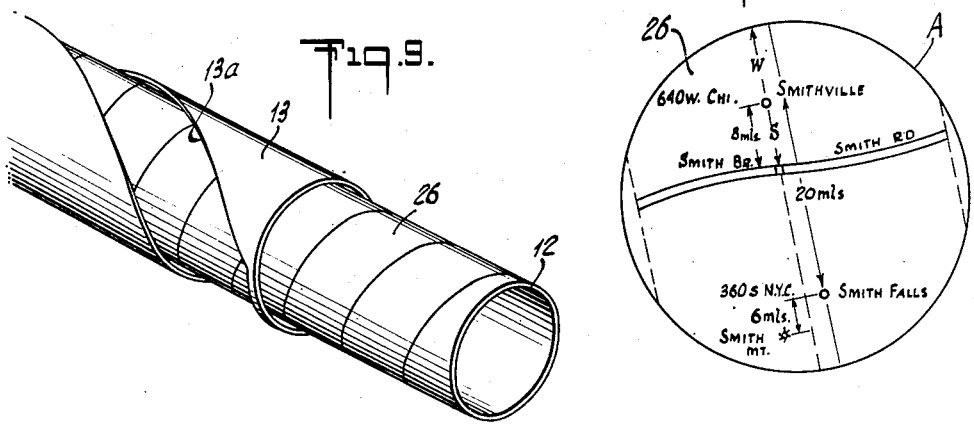

2,619,750

UNITED STATES PATENT OFFICE 2,619,750

VIEWING APPARATUS

Herman Niessen, Brooklyn, N. Y., assignor of one-half to John Aho, Brooklyn, N. Y.

Application May 10, 1946, Serial No. 668,793

12 Claims. (Cl. 40—44)

This invention relates to viewing apparatus, and particularly to mechanically operated apparatus which can be conveniently mounted upon the instrument board of an automobile for exhibiting a road map.

The apparatus of the invention in one embodiment comprises an attractive housing or casing having therein a pair of coaxially arranged cylindrical tubes which are rotatable relative to each other and movable in response to forward movement of the automobile. The inner cylinder or route tube carries the road map which is spirally wound thereon. This road map is in the form of a strip or web. The outer cylinder or window tube is provided with a spiral window having approximately one turn extending over the entire length of the tube and through which the road map on the inner tube can be viewed. The inner cylinder or route tube may be rotated in one direction while the outer cylinder or window tube is rotated in an opposite direction. It is important that the speeds of rotation of both tubes be so related to each other and to the speed of the automobile that the map which is viewable through the spiral window will indicate the precise geographical location of the vehicle. The two tubes are driven from the shaft of the speedometer through suitable gearing in response to forward movement of the vehicle. It is preferred that the inner cylinder (route tube) and its supported map both be transparent to light, so that a lamp positioned in the interior of the inner cylinder will illuminate the map at night. A glass viewing window is positioned on the housing between the eye of the motorist and the outer cylinder (window tube). The apparatus is provided with means for enabling the map and associated cylinders to be rotated in a reverse direction, as a result of which the device of the invention can indicate the precise geographical location when the motorist retraces his path of travel without the necessity of rewinding the map. Means are provided for enabling the two cylinders to remain idle at the option of the operator.

A more detailed description of the invention follows in conjunction with a drawing wherein:

Fig. 1 is a perspective view of the casing enclosing the mechanically map driven apparatus of the invention;

Fig. 2 is a vertical cross-section taken on line 2—2 of Fig. 1;

Fig. 3 is an enlarged vertical cross-section taken on line 3—3 of Fig. 1, shown partly in elevation;

Fig. 4 is a vertical cross-section taken on line 4—4 of Fig. 3;

Fig. 5 is a fragmental top plan section taken on line 5—5 of Fig. 4;

Fig. 6 is a side elevation of the outer rotatable tube with its spiral window;

Fig. 7 is a side elevation of the inner rotatable tube with the web or strip map wound spirally around it;

Fig. 8 is an enlarged view of a portion of the map of Fig. 7;

Fig. 9 is a perspective view showing the assembly of the inner and outer rotatable tubes.

Throughout the figures of the drawing the same parts are represented by the same reference numerals.

In the drawing, the housing or casing is designated 10. This casing may be mounted on the instrument panel and is provided with a window 11 through which the particular portion of the road map to be viewed is seen. End covers 10a and 10b serve to enclose the apparatus and prevent dirt from entering the interior of the casing.

Within the casing there are provided an inner cylinder or route tube upon which the map is spirally wound, and an outer cylinder or window tube having a spiral window therein. The general construction of these tubes and the manner in which they fit into each other may be understood by reference to Figs. 6, 7 and 9. In these figures, the outer cylinder or window tube is designated 13 and is provided with a spiral window 13a. The inner cylinder or route tube is designated 12 and carries the map web 26 which is spirally wound thereon. Both the inner tube and the map are preferably transparent to enable light to pass therethrough.

An inspection of Figs. 2 through 5 will show the details of construction of the apparatus of the invention. Window tube 13 is mounted at one end on a bearing or end plate 13b which is rotatable with the tube. The other end of tube 13 is provided on its interior with a ring gear 43 which rests on driving gear 42. The inner or route tube 12 is mounted at both ends on bearing or end plates 12a and 12b which are rotatable with the inner tube. The end plates 12a and 13b are spaced from each other by spacers or washers 40, and are mounted on a sleeve 38 which surrounds a supporting pintle 39.

Within the inner cylinder or route tube 12 there is a light reflecting semi-circular surface 14 having along its axis a lamp 15. Lamp 15 when energized serves to illuminate the map 26 wound upon the inner tube, and this illumination at night is visible through the spiral window 13a of the outer tube and window 11. This window serves to indicate the precise geographical location of the vehicle.

Lamp 15, its supporting socket, and the wiring therefor are accommodated within an aperture 46 in the gear support 45.

The route tube 12 and window tube 13 are rotated in opposite directions by means of gearing 43, 42, 41, 17 and speedometer shaft 36. Mounted on the end of shaft 36 is a bevel gear 17 for engaging either one of the two bevel gears 16 or 18 at the option of the motorist. Gears 16 and 18 are joined together by a shaft 21 which is supported in a bearing 50. This bearing has a sleeve which provides a sliding fit for the shaft 21.

Gear 16 is integrally fixed to drive gear 42 which, in turn, engages the internal gear 43 forming part of outer tube (window tube) 13. Gear 42 also drives pinion gear 41 but in a direction opposite to the direction of travel of tube 13. Pinion gear 41 is mounted on the support 45 and is riveted on its inner side to the bearing or end plate 12b forming part of the inner (route) tube 12. Thus, motion of the speedometer shaft 36 causes rotation of the outer and inner tubes 13 and 12, respectively, in opposite directions.

An idler gear 35 is mounted on an idler gear shaft 37 for balancing or off-setting the driving gear which is mounted on the other side of the longitudinal axis of the apparatus.

In order to reverse the relative directions of travel of the inner and outer (route and window) tubes 12 and 13, there is provided a shaft 19 with a handle 19a for moving the shaft 21 to thereby disengage bevel gear 16 from bevel gear 17 and to cause bevel gear 18 to engage bevel gear 17. As will be noted from Fig. 5, shaft 19 is pivoted to the casing 10 at 23 and is linked to shaft 21 and 22 by means of a shoulder screw 24. The slot 25 enables the screw to shift position as the shaft 19 is moved.

Shaft 19 his three positions: First, a position 29 which is the forward travel position for the map. Second, a neutral position 30 in which neither bevel gear 16 or 18 engages the drive bevel gear 17. This is the idler position so to speak for the inner and outer tubes. And third, the reverse position 28 for reversing the relative motions of the inner and outer tubes 12 and 13. These positions are indicated by slots in Figs. 1 and 5 which are labeled with the same position numbers. It should be noted that a knob 20 is fastened to one end of shaft 22 and hence is linked to shaft 21. Note Figs. 3 and 5.

When the shaft 19 is in the neutral position 30, any rotation of knob 20 will cause rotation of the inner and outer tubes, and hence enable manual adjustment of the starting position of the road map and inner tube.

The support plate 45 serves to support the gears 41 and 35 and the speedometer shaft 36.

The speeds of rotation of the route and window tubes 12 and 13 are so related to the speed of the vehicle that the map will always indicate the precise location of the vehicle. The coincidence of the window tube 13 with the route spiral will result in a follow-up of the route throughout its entire length at any given straight line along the window tube. The route markings on the web map are visible on the light sensitive screen or vision plate to the rays of light passing through the route tube.

The route tube 12, as indicated in Fig. 8, is provided with a notch 51 which permits the same desired alignment of this tube whenever it is removed and replaced.

It should be understood that the feature of the invention which involves the rotatable transparent inner tube and the opaque outer tube with the spiral window therein, and the lamp within the inner tube, is not limited to use with apparatus of the kind described above, but may have general application in picture projection apparatus.

I claim:

1. Viewing apparatus comprising a tube upon which a road map to be viewed is positioned, a surrounding outer tube having a single opening over the length thereof in the form of a spiral, means for passing light from the interior of said first tube through said spiral in said outer tube, and means for rotating said tubes relative to each other.

2. Viewing apparatus comprising a transparent tube for carrying a transparent film, a surrounding outer opaque tube having a single spiral window opening over the length thereof, a lamp positioned in the interior of said inner tube, and means for rotating said tubes relative to each other.

3. Viewing apparatus comprising a tube for supporting an object to be viewed, a lamp within said tube, a surrounding outer tube having a spiral opening over the length thereof, and means for simultaneously rotating said tubes in opposite directions.

4. Viewing apparatus comprising a transparent tube for supporting a transparent film, a surrounding outer opaque tube having a spiral window opening over the length thereof, a lamp positioned in the interior of said inner tube, and means for simultaneously rotating said tubes in opposite directions, said means including gears and linkages for reversing the directions of rotation of said tubes.

5. Mechanically driven road map exhibiting apparatus for use on vehicles, comprising an inner rotatable tube for supporting a strip or web of road map, a coaxially arranged outer rotatable tube having a spiral opening over the length thereof, gears for rotating said tubes relative to each other, and a drive shaft for said gears.

6. Mechanically driven road map exhibiting apparatus for use on vehicles, comprising an inner rotatable tube for supporting a strip or web of road map, a coaxially arranged outer rotatable tube having a spiral opening over the length thereof, said outer tube having an internal gear on its inner surface near one end, linked gears for driving said tubes in opposite directions, and a common drive shaft for said gears.

7. Mechanically driven road map exhibiting apparatus for use on vehicles, comprising an inner rotatable and transparent tube for carrying a transparent strip or web of road map, a coaxially arranged opaque outer rotatable tube having a spiral opening over the length thereof, a lamp in the interior of said inner tube, a light reflector on one side of said lamp and also positioned in the interior of said inner tube, gears for simultaneously rotating said tubes at different speeds, a drive shaft for said gears, a housing for said apparatus, and a viewing screen for said housing so positioned as to receive the light passing through said inner tube and map and through the spiral opening of said outer tube.

8. Mechanically driven road map exhibiting apparatus for use on vehicles, comprising an inner rotatable and transparent tube for carrying a transparent strip or web of road map, a coaxially arranged opaque outer rotatable tube having a spiral opening over the length thereof, a lamp in the interior of said inner tube, a light reflector on one side of said lamp and also positioned in the interior of said inner tube, gears for simultaneously rotating said tubes in opposite directions, a drive shaft for said gears, a housing for said apparatus, and a viewing screen for said housing so positioned as to receive the light passing through said inner tube and map and through the spiral opening of said outer tube.

9. Mechanically driven road map exhibiting apparatus for use on vehicles, comprising an inner rotatable tube for carrying a strip or web of road map, a coaxially arranged outer rotatable tube having a spiral opening over the length tnereof, gears for rotating said tubes in opposite directions, a drive shaft for said gears adapted to be linked to the motor of said vehicle, means for reversing the directions of rotation of said tubes, and means for effectively disengaging said shaft from said tubes at the will of the operator.

10. Viewing apparatus for a vehicle comprising a tube for carrying a road map, a surrounding outer tube having a spiral opening over the length thereof, gears linked to said tubes, a drive shaft engaging said gears, and manually operable means including a control lever linked to said gears for selectively operating said gears to rotate said tubes relative to each other.

11. Viewing apparatus comprising an inner rotatable tube upon which the object to be viewed is adapted to be positioned, a surrounding outer tube having a spiral opening over the length thereof, gears for rotating said tubes in opposite directions, a drive shaft for said gears, means for reversing the directions of rotation of said tubes, and means for effectively disengaging said shaft from said tubes at the will of the operator.

12. Viewing apparatus for a vehicle comprising a tube for carrying a road map, a surrounding outer tube having a single turn spiral opening extending substantially over the entire length thereof, means for rotating said tubes relative to each other, and means for reversing the directions of rotation of said tubes.

HERMAN NIESSEN.

REFERENCES CITED

The following references are of record in the file of this patent:

UNITED STATES PATENTS

| Number | Name | Date |
|---|---|---|
| 645,641 | Ferguson | Mar. 20, 1900 |
| 1,145,022 | Keuffel | July 6, 1915 |
| 1,349,081 | Middleton | Aug. 10, 1920 |
| 1,945,968 | De Amicis | Feb. 6, 1934 |
| 2,042,615 | Maxson | June 2, 1936 |
| 2,081,321 | Carlson | May 25, 1937 |
| 2,134,150 | Schmidt | Oct. 25, 1938 |